(12) United States Patent
Um et al.

(10) Patent No.: US 8,144,294 B2
(45) Date of Patent: Mar. 27, 2012

(54) LIQUID CRYSTAL DISPLAY HAVING A CUTOUT IN A PIXEL ELECTRODE AND A CUTOUT IN A COMMON ELECTRODE

(75) Inventors: Yoon-Sung Um, Yongin-si (KR); Jae-Jin Lyu, Yongin-si (KR); Seung-Beom Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 12/560,227

(22) Filed: Sep. 15, 2009

(65) Prior Publication Data

US 2010/0214517 A1    Aug. 26, 2010

(30) Foreign Application Priority Data

Feb. 23, 2009    (KR) .................. 10-2009-0014985

(51) Int. Cl.
G02F 1/1337    (2006.01)
(52) U.S. Cl. ........................................ 349/129
(58) Field of Classification Search .................. 349/129
See application file for complete search history.

(56) References Cited

U.S. PATENT DOCUMENTS 6,992,329 B2 *   1/2006   Wu et al. .................... 257/59
7,321,412 B2 *   1/2008   Sasaki et al. ................ 349/129

* cited by examiner

Primary Examiner — Nathanael R Briggs
(74) Attorney, Agent, or Firm — H.C. Park & Associates, PLC (57) ABSTRACT

A liquid crystal display according to an exemplary embodiment of the present invention includes a first insulation substrate; a pixel electrode disposed on the first insulation substrate and including a first cutout; a second insulation substrate facing the first insulation substrate; and a common electrode disposed on the second insulation substrate and a second cutout arranged alternately with the first cutout, wherein at least one of the first cutout and the second cutout includes a stem and a plurality of first slits and a plurality of second slits extended from the stem and obliquely inclined with respect to the length direction of the stem, and an inclined direction of the first slits is opposite to an inclined direction of the second slits.

19 Claims, 6 Drawing Sheets

LIQUID CRYSTAL DISPLAY HAVING A CUTOUT IN A PIXEL ELECTRODE AND A CUTOUT IN A COMMON ELECTRODE

CROSS-REFERENCE TO RELATED APPLICATION

This application claims priority from and the benefit of Korean Patent Application No. 10-2009-0014985, filed on Feb. 23, 2009, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display (LCD) is one of the most widely used flat panel displays (FPD), and is composed of two display panels on which field generating electrodes, such as pixel electrodes and a common electrode, are formed with a liquid crystal layer interposed between the two display panels. In a liquid crystal display, voltages are applied to field generating electrodes in order to generate an electric field over the liquid crystal layer. The electrical field determines the alignment of liquid crystal molecules of the liquid crystal layer. Accordingly, the polarization of incident light is controlled, thereby performing image display.

The LCD also includes switching elements connected to the respective pixel electrodes, and a plurality of signal lines, such as gate lines and data lines, for controlling the switching elements and applying voltages to the pixel electrodes.

Among the LCDs, a vertical alignment (VA) mode LCD, which aligns liquid crystal (LC) molecules, such that their long axes are perpendicular to the panels in the absence of an electric field, is spotlighted because of its high contrast ratio and wide reference viewing angle.

The wide viewing angle of a VA mode LCD can be realized by cutouts in the field-generating electrodes and protrusions on the field-generating electrodes. Since the cutouts and the protrusions can determine the tilt directions of the LC molecules, the tilt directions can be distributed in several directions by using the cutouts and the protrusions such that the reference viewing angle is widened.

Here, the liquid crystal molecules disposed close to the protrusions or the cutouts are strongly controlled, however the influence of the protrusions or the cutouts is weak on the liquid crystal molecules disposed away from the protrusions.

Particularly, the electric field's effect is weak on the liquid crystal molecules disposed inside the cutout such that they are inclined into various directions such that the liquid crystal molecules collide with each other, and as a result, they are irregularly and unstably arranged.

SUMMARY OF THE INVENTION

Exemplary embodiments of the present invention provide stably arranging the liquid crystal molecule having a weak influence inside the cutouts of electrodes.

Additional features of the invention will be set forth in the description which follows, and in part will be apparent from the description, or may be learned by practice of the invention.

An exemplary embodiment of the present invention discloses a liquid crystal display having a first insulation substrate; a pixel electrode disposed on the first insulation substrate; the pixel electrode comprising a first cutout; a second insulation substrate facing the first insulation substrate; a common electrode disposed on the second insulation substrate; and the common electrode comprising a second cutout arranged alternatively with the first cutout, wherein at least one of the first cutout and the second cutout comprises a stem and a plurality of first slits and a plurality of second slits extended from the stem and obliquely inclined with respect to the length direction of the stem, and an inclined direction of the first slits is opposite to an inclined direction of the second slits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
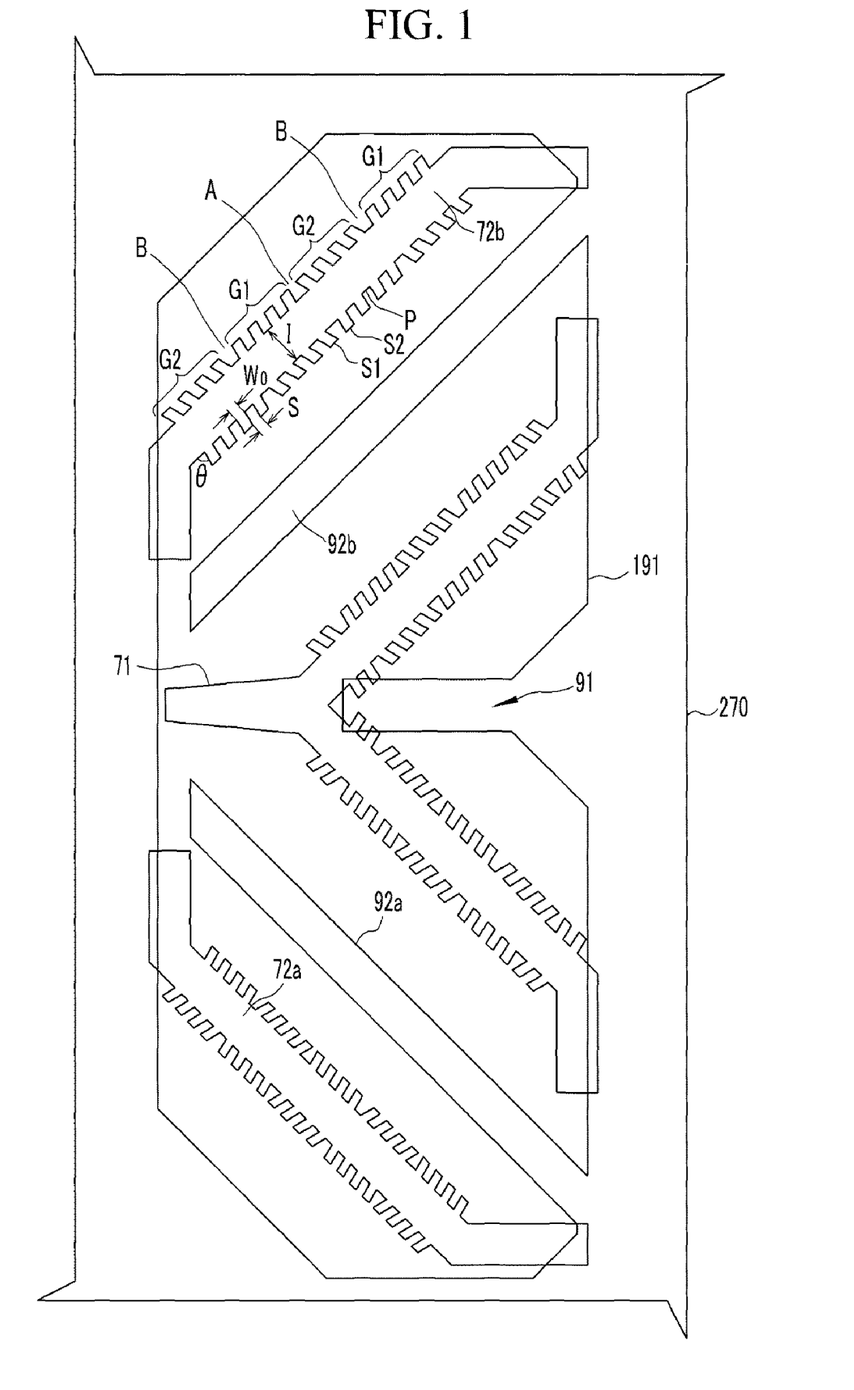
FIG. 1 is a view showing cutouts of a common electrode and a pixel electrode according to an exemplary embodiment of the present invention.

FIG. 1 is a view showing cutouts of a common electrode and a pixel electrode according to an exemplary embodiment of the present invention, and FIG. 3, FIG. 4, FIG. 5, and FIG. 6 are views showing a portion of cutouts according to another exemplary embodiment of the present invention.

Referring to FIG. 1, a common electrode 270 and a pixel electrode 191 of a liquid crystal display according to an exemplary embodiment of the present invention includes a plurality of cutouts 71, 72a, 72b, 91, 92a, and 92b.

The pixel electrode 191 is quadrangular having four main edges, and left chamfered corners. The chamfered oblique edge of the pixel electrode 191 forms an angle of 45 degrees with respect to the major edges.

The pixel electrode 191 has a central cutout 91, a lower cutout 92a, and an upper cutout 92b, and the pixel electrode 191 is divided into a plurality of regions by the central cutout 91, the lower cutout 92a, and the upper cutout 92b. The central cutout 91, the lower cutout 92a, and the upper cutout 92b have inversion symmetry with respect to an imaginary transverse line bisecting the pixel electrodes 191 in the transverse direction.

The lower cutout 92a and the upper cutout 92b are approximately obliquely inclined from the right edge of the pixel electrode 191 to the left edge, and are respectively disposed on the lower-half portion and the upper-half portion with respect to the transverse central line of the pixel electrode 191. The lower cutout 92a and the upper cutout 92b are inclined with respect to the transverse central line of the pixel electrode 191 by an angle of about 45° and extend perpendicularly to each other.

The central cutout 91 extends along the transverse central line of the pixel electrode 191 and has an inlet from the right edge of the pixel electrode 191. The inlet of the central cutout 91 has a pair of inclined edges substantially parallel to the oblique portions of the lower cutout 92a and the upper cutout 92b.

Accordingly, the lower half of the pixel electrode 191 is partitioned into two lower partitions by the lower cutout 92a and the upper half of the pixel electrode 191 is partitioned into two upper partitions by the upper cutout 92b. The number of partitions and the number of cutouts can be varied depending on design factors such as the size of pixels, the ratio of the transverse edges and the longitudinal edges of the pixel electrodes, the type and characteristics of the liquid crystal layer 3, and so on.

Also, the cutouts 71, 72a, and 72b of the common electrode 270 face the pixel electrode 191, and include a central cutout 71, a lower cutout 72a, and an upper cutout 72b. Each of the central cutout 71, the lower cutout 72a, and the upper cutout 72b is disposed between adjacent central cutout 91, lower cutout 92a, and upper cutout 92b of the pixel electrode 191 or between the lower cutout 92a and the upper cutout 92b and the chamfered edges of the pixel electrode 191. In addition, each of the central cutout 71, the lower cutout 72 a, and the upper cutout 72b has at least one oblique portion extending parallel to the lower cutout 92a or the upper cutout 92b.

Each oblique portion includes a stem P and minute slits S1 and S2. The minute slit extends from an edge of the stem P, and includes a plurality of first slits S1 and second slits S2 obliquely inclined with respect to the length direction of the stem. The first slits S1 and the second slits S2 form an angle θ of 10-90° with respect to the oblique portion. The inclined direction of the first slits S1 and the inclined direction of the second slits S2 are opposite to each other.

The first slits S1 and the second slits S2 are respectively disposed on two facing edges of the stem P, and the first slits S1 and the second slits S2 are symmetrical to each other on two edges of the stem P.

The width $W_0$ of each first slit S1 is equal to the interval S between two neighboring first slits S1, and the width $W_0$ of each second slit S2 is equal to the interval S between two neighboring second slits S2.

When the interval of the liquid crystal layer between the common electrode 270 and the pixel electrode 191 is referred to as a cell gap d, the width $W_0$ of the first slit S1 may be in the range of d/3 to 3d, and the interval S between the neighboring first slits S1 may be in the range of d/3 to 3d. Here, the width I of the stem P of the central cutout 71, the lower cutout 72a, and the upper cutout 72b may be in the range of d<I<3d.

When a set including a predetermined number of the first slits S1 and a set including a predetermined number of the second slits S2 are respectively referred to as the first slit group G1 and the second slit group G2, the first slit group G1 and the second slit group G2 are alternately disposed along the stem P.

The central cutout 71, the lower cutout 72a, and the upper cutout 72b have inversion symmetry with respect to the imaginary transverse central line.

In the liquid crystal display including the common electrode 270 and the pixel electrode 191 according to an exemplary embodiment of the present invention, the common electrode 270 is applied with a common voltage and the pixel electrode 191 is applied with a data voltage such that an electric field is generated perpendicular to the surface of the substrate formed with the common electrode 270 or the pixel electrode 191. The liquid crystal molecules (not shown) (hereafter, the pixel electrode 191 and the common electrode 270 are referred to as field generating electrodes) between the field generating electrodes 191 and 270 are arranged in response to the electric field such that the long axes thereof tend to be perpendicular to the electric field direction.

The central cutouts 71 and 91, the lower cutouts 72a and 92a, and the upper cutouts 72b and 92b of the field generating electrodes 191 and 270 and the edges of the pixel electrodes 191 distort the electric field to generate a horizontal component, which determines the tilt directions of the liquid crystal molecules. The horizontal component of the electric field is substantially perpendicular to the edges of the central cutouts 71 and 91, the lower cutouts 72a and 92a, the upper cutouts 72b and 92b, and the pixel electrodes 191.

Also, the liquid crystal molecules disposed inside the central cutout 71, the lower cutout 72a, and the upper cutout 72b start to incline at the arbitrary position and are continuously inclined like dominos in the same direction. Here, the liquid crystal molecules are inclined in various directions at various positions and the liquid crystal molecules that are inclined in the opposite directions collide at the arbitrary positions.

According to an exemplary embodiment of the present invention, when the first slit S1 and the second slit S2 are formed, the position that starts to incline may be determined.

Among the portion where the first slit S1 and the second slit S2 are neighboring each other, the liquid crystal molecules start to spread out on the portion where the first slits S1 and the second slits S2 are closer to each other as the first slits S1 and the second slits S2 are further from the stem P, and start to gather on the portion where the first slits S1 and the second slits S2 are away from each other as the first slits S1 and the second slits S2 are further from the stem P. Hereafter, the portion where the liquid crystal molecules start to spread out is referred to as an emission region A, and the portion where the liquid crystal molecules are gathered is referred to as a converging region B.

Like an exemplary embodiment of the present invention, the first slit group G1 and the second slit group G2 including a plurality of slits S1 and S2 disposed to have the uniform intervals such that the emission region A and the converging region B may be generated at uniform intervals.

In an exemplary embodiment of the present invention, one emission region A is formed, however a plurality of emission regions A may be formed according the size of the pixel electrode, and the number and the size of the cutouts.

Also, if the emission region A and the converging region B are formed, the inclination direction of the liquid crystal molecules may be quickly determined such that the response speed of the liquid crystal may be improved.

In the above described exemplary embodiment, the minute slits are formed at the cutout of the common electrode, however the minute slits may be formed at the cutout of the pixel electrode. When the minute slits are formed at the cutout of the pixel electrode, the converging region and the emission region are opposite to those of the common electrode.

Figure 2:
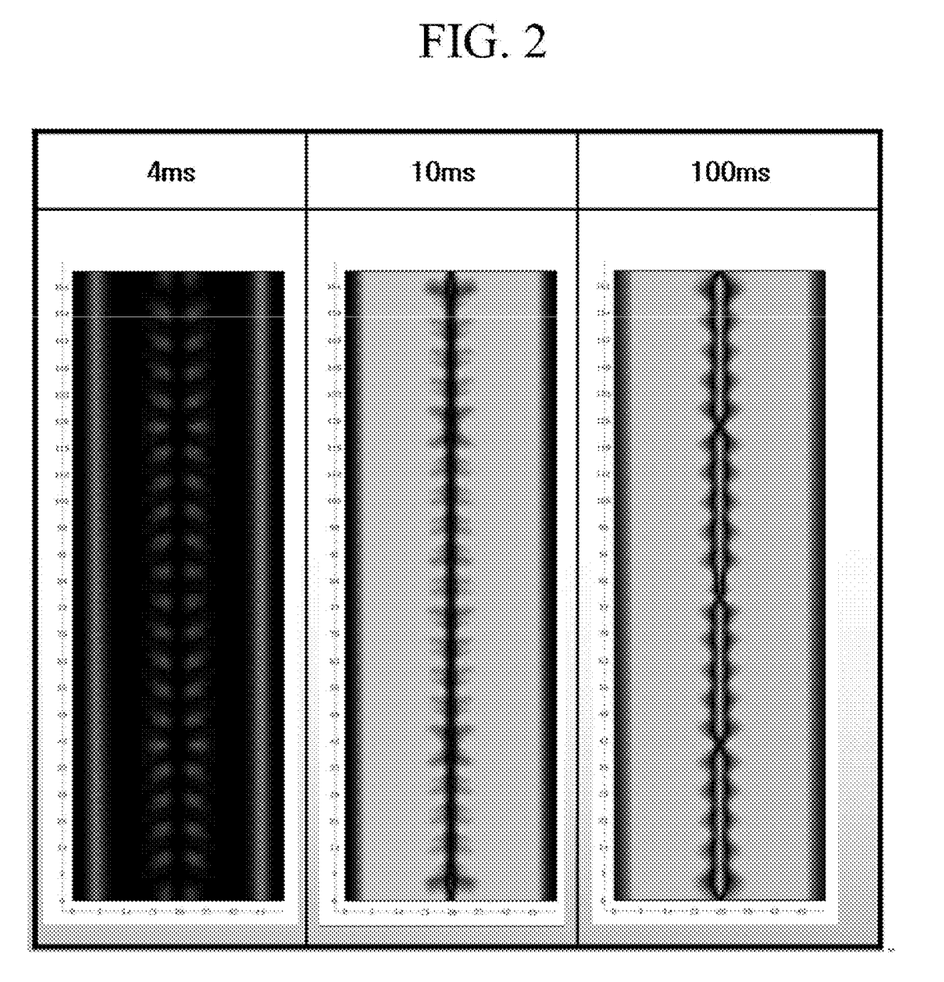
FIG. 2 is a photograph for measuring light leakage according to time in a liquid crystal display including minute slits according to an exemplary embodiment of the present invention.

FIG. 2 is a photograph for measuring light leakage according to time in a liquid crystal display including minute slits according to an exemplary embodiment of the present invention.

Referring to FIG. 2, when a voltage is applied to change a black state into a white state, the liquid crystal molecules in the domain are maintained as the black state at an initial time of 4 ms when the voltage is applied, however light leakage is generated in the portion where the minute slits are formed. However, the liquid crystal molecules in the domain are arranged in the white state according to the passage of time, and are changed to the white state except for the liquid crystal molecules that are disposed on the center of the cutouts. Also, the arrangement of the liquid crystal molecules that are disposed inside the cutouts become stable at a time of 100 ms such that it may be confirmed that singular points are formed with the uniform interval. The singular points are formed on the converging region B of the minute slits.

The minute slits may be formed with various shapes, as shown in FIG. 3, FIG. 4, FIG. 5, and FIG. 6.

FIG. 3, FIG. 4, FIG. 5, and FIG. 6 are views showing minute slits according to another exemplary embodiment of the present invention.

Figure 3:
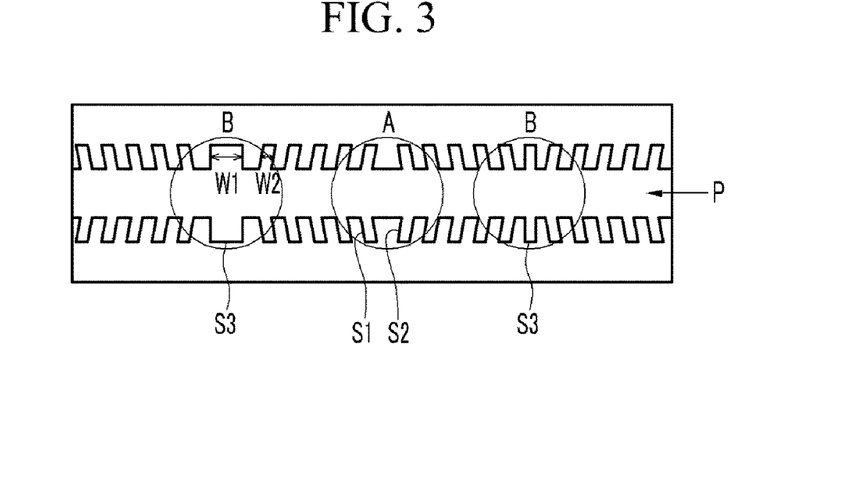
FIG. 3, FIG. 4, FIG. 5, and FIG. 6 are views showing a portion of cutouts according to another exemplary embodiment of the present invention.

As shown in FIG. 3, the converging region B may include a third slit S3 protruded from the stem P in the vertical direction between the first slit group G1 and the second slit group G2. That is, the first slit S1 and the second slit S2 that are close to the third slit S3 are inclined in the direction away from the third slit S3 further from the stem. In other words, the first slit S1 and the second slit S2 are sandwiching the third slit S3 and are inclined in a direction away from the third slit S3 at ends of the first slit S1 and the second slit S2.

The third slit S3 is for easily gathering the liquid crystal molecules, and the width W1 of the third slit S3 may be larger than the width W2 of the first slit S1 and the second slit S2.

Figure 4:
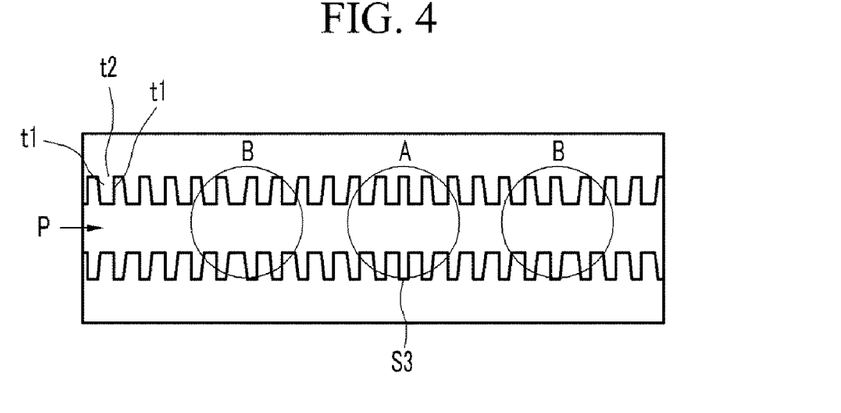

In additional, as shown in FIG. 4, the width of the first slit S1 and the second slit S2 may be decreased further from the stem P. Here, among two long edges t1 and one short edge t2 connecting the two long edges t1 thereby forming the slits, the two long edges t1 may be obliquely inclined with respect to the stem, as shown in FIG. 3, however only one of two long edges t1 may be obliquely inclined with respect to the stem, as shown in FIG. 4.

As described above, the width of the portion adjacent to the stem is widened to ease the movement of the liquid crystal molecules.

Figure 5:
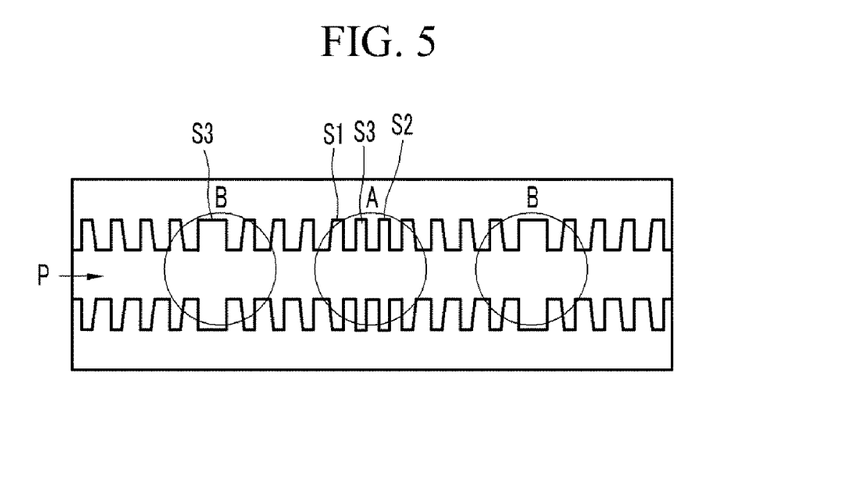

Also, as shown in FIG. 5, the third slit S3 extending vertically from the stem may be formed in the emission region A and the converging region B. Here, the third slit S3 of the converging region B may be wider than the third slit S3 of the emission region A.

Figure 6:
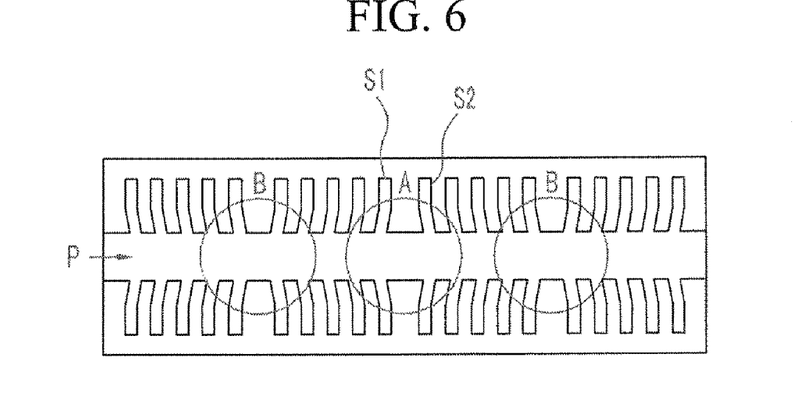

Also, as shown in FIG. 6, the first slit S1 and the second slit S2 may include at least one curved portion. That is, the first slit S1 and the second slit S2 include a lower portion connected to the stem P and an upper portion extended from the lower portion, and the lower portion and the upper portion form an obtuse angle.

This curved portion fixes the rearranged liquid crystal molecules thereby forming the stable arrangement.

Next, a liquid crystal display including the above-described minute slit pattern will be described in detail with reference to FIG. 7, FIG. 8, and FIG. 9.

Figure 7:
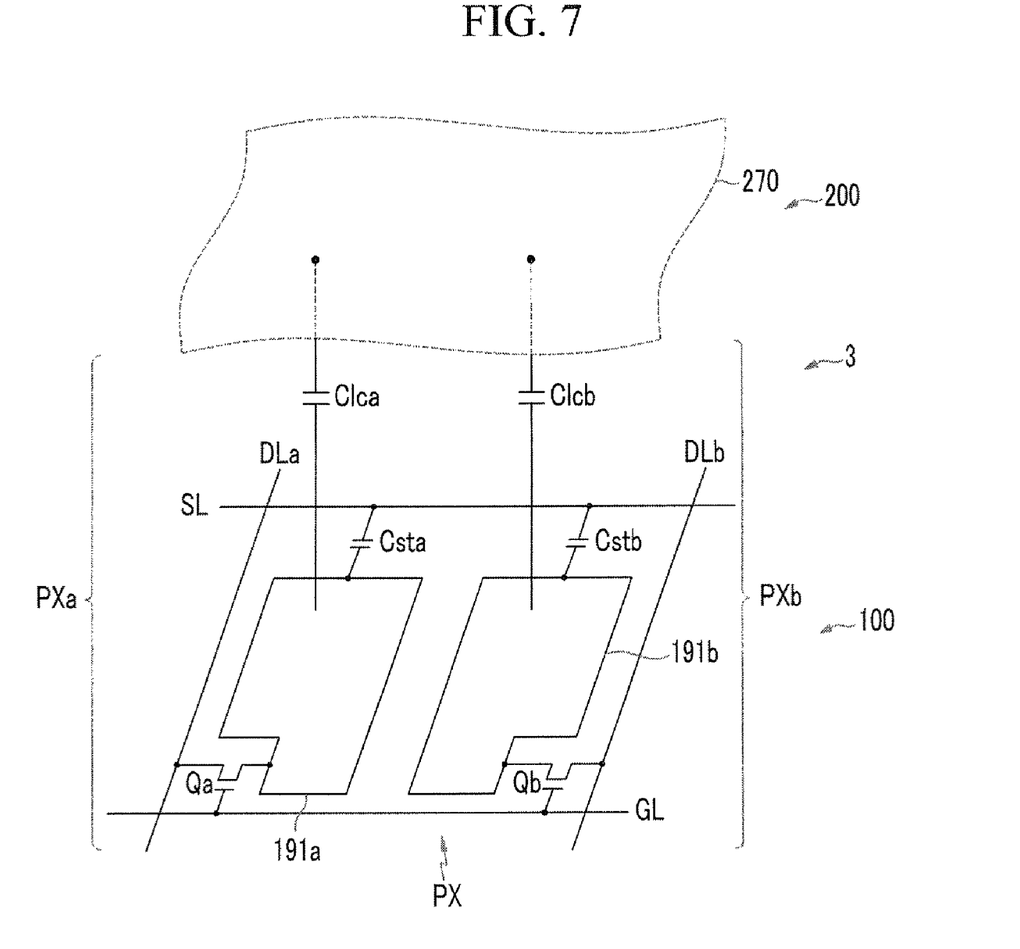
FIG. 7 is an equivalent circuit diagram of one pixel of a liquid crystal display according to an exemplary embodiment of the present invention.

FIG. 7 is an equivalent circuit diagram of one pixel of a liquid crystal display according to an exemplary embodiment of the present invention.

Referring to FIG. 7, a liquid crystal display according to an exemplary embodiment of the present invention includes signal lines, including a plurality of gate lines GL, a plurality of pairs of data lines DLa and DLb, a plurality of storage electrode lines SL, and a plurality of pixels PX connected to the signal lines. In the point of view of a structure, the liquid crystal display includes a lower panel 100 and an upper panel 200 facing each other, and a liquid crystal layer 3 interposed therebetween.

Each pixel PX includes a pair of subpixels PXa and PXb. Each subpixel PXa and PXb includes a switching element Qa and Qb, a liquid crystal capacitor Clca and Clcb, and a storage capacitor Csta and Cstb.

Each switching element Qa and Qb is a three-terminal element such as a thin film transistor provided on the lower panel 100, having a control terminal connected to the gate line GL, an input terminal connected to the data line DLa and DLb, and an output terminal connected to the liquid crystal capacitor Clca and Clcb and the storage capacitor Csta and Cstb.

The liquid crystal capacitor Clca and Clcb uses a subpixel electrode and a common electrode 270 as two terminals. The liquid crystal layer 3 between electrodes 191a and 191b and 270 functions as a dielectric material.

The storage capacitor Csta and Cstb serving as an assistant to the liquid crystal capacitor Clca and Clcb is formed as a storage electrode line SL provided on the lower display panel 100 and a subpixel electrode 191a and 191b overlap with an insulator interposed therebetween, and a predetermined voltage such as a common voltage is applied thereto.

It has been determined that a predetermined difference is generated between voltages charged to two liquid crystal capacitors Clca and Clcb. For example, the data voltage applied to the liquid crystal capacitor Clca is less or more than the data voltage applied to the liquid crystal capacitor Clcb. Therefore, when the voltages of the first and second liquid crystal capacitors Clca and Clcb are appropriately adjusted, it is possible to make an image viewed from the side be as similar as possible to an image viewed from the front, and as a result it is possible to improve the side visibility.

Next, one example of the liquid crystal panel assembly shown in FIG. 7 will be described with reference to FIG. 8 and FIG. 9.

Figure 8:
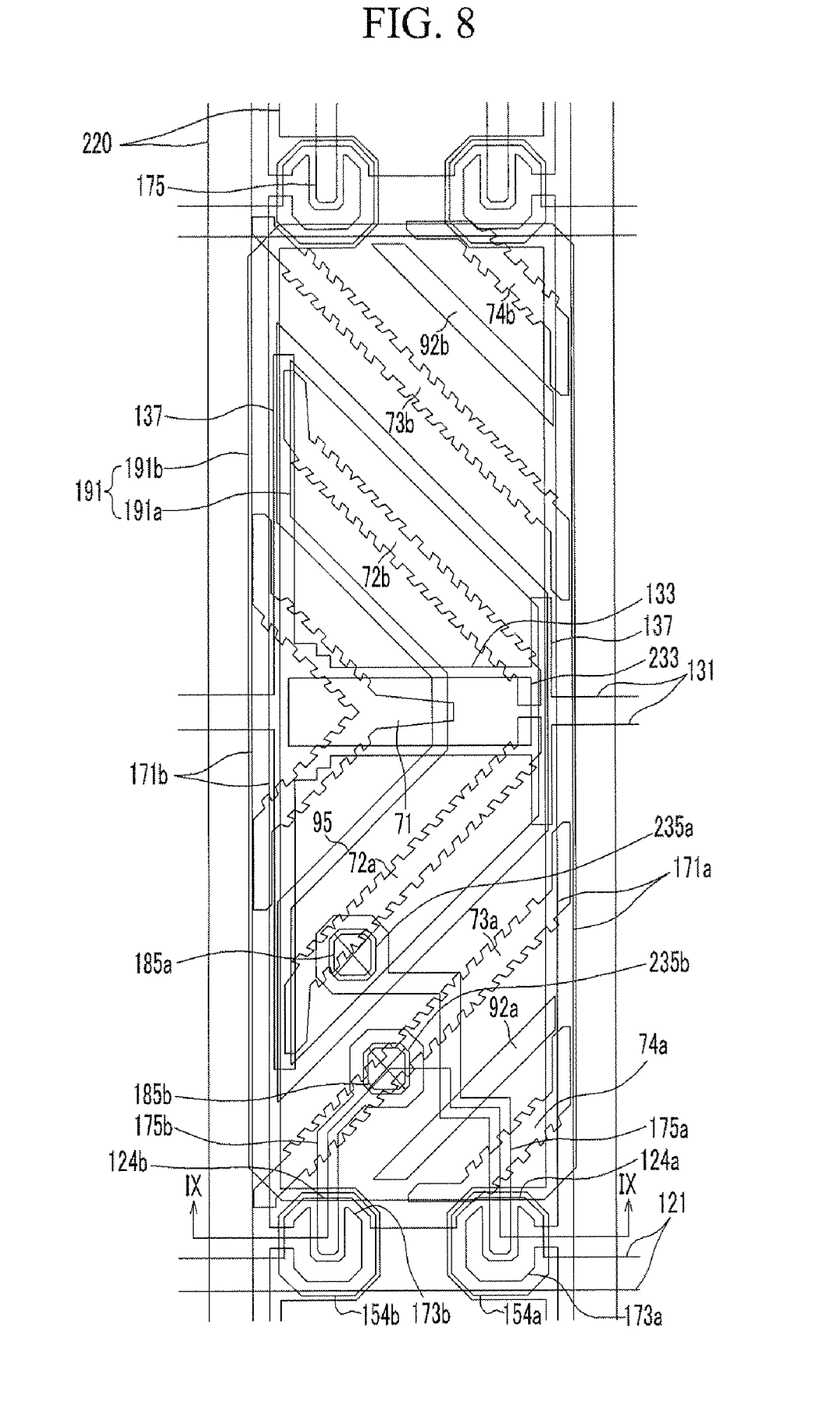
FIG. 8 is a layout view of a liquid crystal display according to an exemplary embodiment of the present invention.
Figure 9:
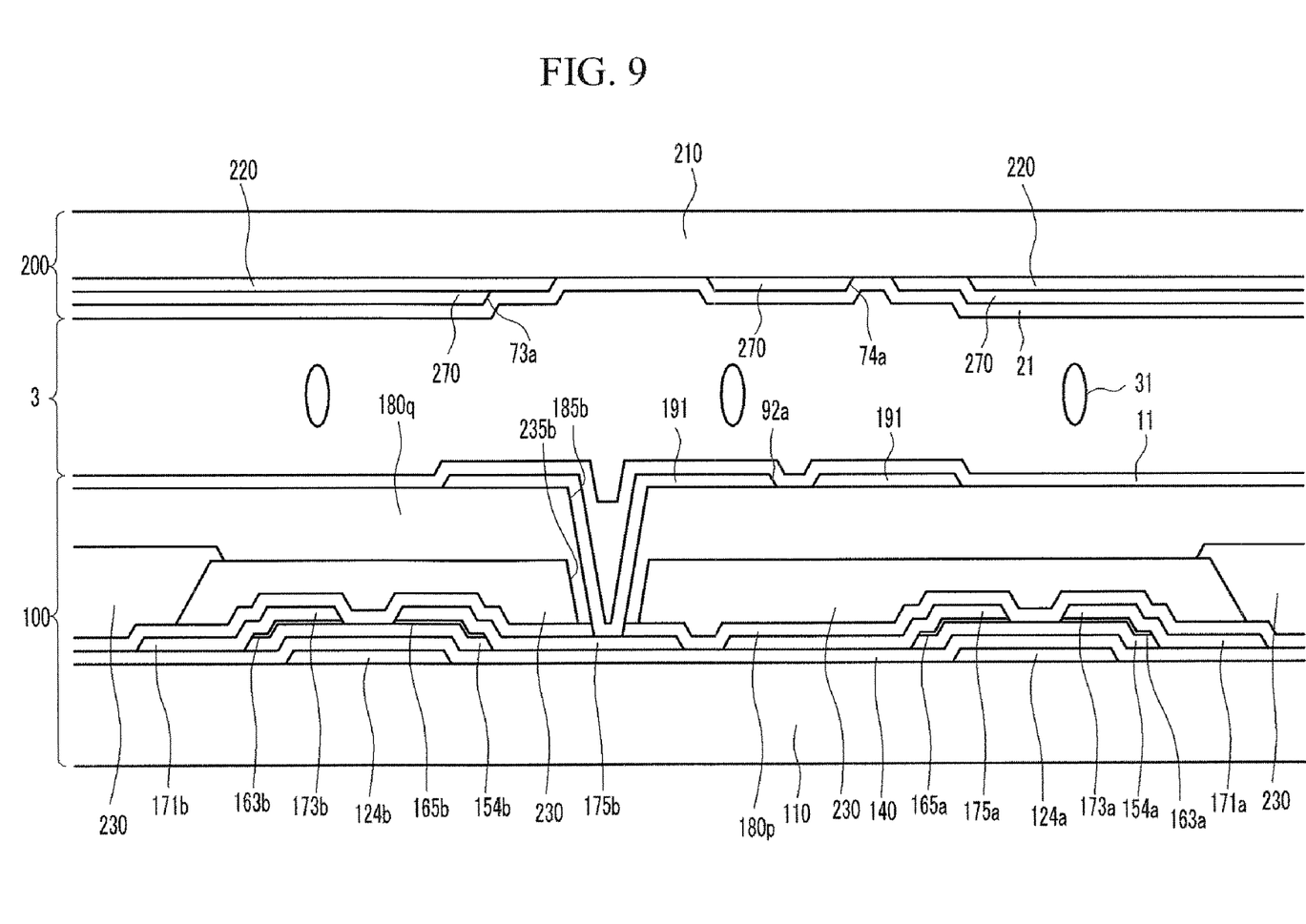
FIG. 9 is a cross-sectional view taken along line IX-IX of FIG. 8.

FIG. 8 is a layout view of a liquid crystal display according to an exemplary embodiment of the present invention, and FIG. 9 is a cross-sectional view taken along the line IX-IX shown in FIG. 8.

Firstly, a lower panel will be described.

As shown in FIG. 8 and FIG. 9, a plurality of gate conductors including a plurality of gate lines 121 and a plurality of storage electrode lines 131 are formed on an insulation substrate 110 made of transparent glass or plastic.

The gate lines 121 transmit gate signals and extend substantially in a transverse direction. Each gate line 121 includes a plurality of a first gate electrode 124a and a second gate electrode 124b protruding upward, and an end may be extended for connecting with another layer or external driving circuits.

The storage electrode lines 131 extend substantially in the transverse direction and receive a predetermined voltage. Each storage electrode line 131 is disposed between two neighboring gate lines 121, and maintains the same distance from the two gate lines 121. The storage electrode line 131 includes an expansion 133 expanded upward and downward and a branch 137 extending perpendicular from the storage electrode line 131.

A gate insulating layer 140 preferably made of silicon nitride (SiNx) or silicon dioxide (SiOx) is formed on the gate lines 121 and the storage electrode lines 131.

A plurality of a first and a second semiconductor island 154b are preferably made of hydrogenated amorphous silicon or crystallized silicon, and are formed on the gate insulating layer 140. A semiconductor island 154a is respectively disposed on the first gate electrodes 124a and a semiconductor island 154b a respectively disposed on the second gate electrode 124b.

A pair of ohmic contact islands 163a, 163b, 165a, and 165 is formed on each semiconductor island 154a and 154b. The ohmic contact islands 163a, 163b, 165a, and 165b are preferably made of n+ hydrogenated a-Si heavily doped with an N-type impurity such as phosphorous, or they may be made of a silicide. The ohmic contacts pairs 163a and 165a are respectively disposed on the first semiconductor island 154a and the ohmic contact pairs 163b and 165b are respectively disposed on the second semiconductor island 154b.

A data conductor including a plurality of data lines 171a and 171b and a plurality of pairs of first and second drain electrodes 173a and 173b are formed on the gate insulating layer 140 and the ohmic contacts 163a, 163b, 163a, and 165b.

The data lines 171a and 171b transmit data voltages and extend in a longitudinal direction, thereby intersecting the gate lines 121 and the storage electrode lines 131. Each of the data lines 171a and 171b respectively includes a plurality of first source electrodes and second source electrodes 173a and 173b extending toward the first gate electrodes and the second gate electrodes 124a and 124b, and an end of data lines 171a and 171b may be extended for connecting with another layer or an external driving circuit.

The first drain electrode 175a and the second drain electrode 175b are separated from each other, and are separated from the data lines 171a and 171b. Each of drain electrodes 175a and 175b faces the first source electrode 173a and the second source electrode 173b with respect to the gate electrodes 124a and 124b, and includes an expansion having a wide area. One end of the drain electrodes 175a and 175b is enclosed by the source electrodes 173a and 173b with a "U" shape.

A first gate electrode 124a and a second gate electrode 124b, a first source electrode 173a and a second source electrode 173b, and a first drain electrode 175a and a second drain electrode 175b respectively form a first and second thin film transistor (TFT) Qa and Qb along with a first semiconductor island 154a and a second semiconductor island 154b, and a channel of the first thin film transistor Qa and second thin film transistor Qb is formed on the first semiconductor island 154a and second semiconductor island 154b between the first source electrode 173a and the second source electrode 173b and the first drain electrode 175a and the second drain electrode 175b.

The ohmic contacts 163a, 163b, 165a, and 165b are interposed only between the underlying semiconductor islands 154a and 154b and the overlying data lines 171a and 171b and drain electrodes 175a and 175b, and reduce contact resistance between them. The semiconductor islands 154a and 154b have a portion that is exposed without being covered by the data lines 171a and 171b and the drain electrodes 175a and 175b, and a portion between the source electrodes 173a and 173b and the drain electrodes 175a and 175b.

A lower passivation layer 180p to protect the exposed semiconductor islands 154a and 154b is formed on the data lines 171a and 171b, the drain electrodes 175a and 175b, and the exposed portions of the semiconductor islands 154a and 154b. The passivation layer 180p is made of silicon nitride.

Color filters 230 are formed on the lower passivation layer 180p. The color filters 230 have a plurality of openings 233, 235a, and 235b and may be extended according to the data lines 171a and 171b. Each of color filters 230 may display one of primary colors such as the three primary colors of red, green, and blue.

The plurality of openings 233, 235a, and 235b are disposed on the expansions of the drain electrodes 175a and 175b and the expansions 133 of the storage electrode lines 131. It may be easy to form contact holes 185a and 185b through the openings 233a and 233b on the drain electrodes 175a and 175b, and the opening 233 of the storage electrode 133 reduce the thickness of the dielectric material forming the storage capacitance such that the storage capacitance may be increased.

A passivation layer 180q made of silicon nitride for preventing the pigment included in the color filter 230 from contaminating upper layers is formed on the color filters 230.

The upper passivation layer 180q, the color filter 230, and the lower passivation layer 180p have the contact holes 185a and 185b respectively exposing the first drain electrode 175a and the second drain electrode 175b.

A plurality of pixel electrodes 191 including the first sub-pixel electrode 191a and the second sub-pixel electrode 191b are formed on the upper passivation layer 180q. The pixel electrodes 191 may be made of a transparent conductive material such as indium tin oxide (ITO) or indium zinc oxide (IZO).

Each of the pixel electrodes 191 has an approximately quadrangle shape having four chamfered corners, and the chamfered edges of the pixel electrode 191 form an angle of about 45 degrees with the gate lines 121a and 121b.

A pair of the first sub-pixel electrode 191a and the second sub-pixel electrode 191b forming each of the pixel electrodes 191 are engaged with each other with a gap 95 therebetween. The first sub-pixel electrode 191a has an isosceles trapezoid shape having bottom edges almost parallel to the data line 171 and the bottom edge thereof being sunken with a trapezoid shape, and most of the first sub-pixel electrode 191a is enclosed by the second sub-pixel electrode 191b. The second sub-pixel electrode 191b includes upper, lower, and central trapezoid portions of which the left edges are connected to each other.

The second sub-pixel electrode 191b includes the lower cutout 92a and the upper cutout 92b that extends from the upper edge of the upper trapezoid portion and the lower edge of the lower trapezoid portion toward the right edge. The central trapezoid portion of the second sub-pixel electrode 191b is inserted in the bottom sunken edge of the first sub-pixel electrode 191a.

The gap 95 between the first sub-pixel electrode 191a and the second sub-pixel electrode 191b includes two pairs of upper oblique portions and lower oblique portions forming an angle of about 45 degrees with the first and the second gate lines 121a and 121b, and a longitudinal portion.

Hereafter, for better comprehension and ease of description, the gap 95 is also described as a cutout. The lower cutout 92a, the upper cutout 92b, and the gap 95 have substantially an inverse symmetrical structure with respect to the storage electrode line 131, and they form an angle of about 45 degrees with respect to the first and second gate lines 121a and 121b and extend perpendicularly to each other. The pixel electrode 191 is divided into a plurality of regions by the lower cutout 92a, the upper cutout 92b, and the gap 95.

Accordingly, the upper-half portion and the lower-half portion are respectively divided into a plurality of regions by the lower cutout 92a, the upper cutout 92b, and the gap 95 with respect to the storage electrode line 131 bisecting the pixel electrode 191 upward and downward.

Here, the number of regions or cutouts may vary depending on design components, such as the size of the pixel electrode 191, the length ratio of the horizontal side and the vertical side of the pixel electrode 191, the type of liquid crystal layer 3, or other characteristics.

The first sub-pixel electrode 191a is respectively connected to the first drain electrode 175a through the contact hole 185a and receives data voltage from the first drain electrode 175a. Similarly, the second sub-pixel electrode 191b is respectively connected to the second drain electrode 175b through the contact hole 185b, and receives data voltage from the second drain electrode 175b. A pair of sub-pixel electrodes 191a and 191b are applied with different predetermined data voltages with respect to one input image signal, and the magnitude thereof may be determined according to the size and shape of the sub-pixel electrodes 191a and 191b. Also, the areas of the sub-pixel electrodes 191a and 191b may be different from each other. For example, the first sub-pixel electrode 191a may be applied with a high voltage compared with the second sub-pixel electrode 191b, and the area thereof may be smaller than the area of the second sub-pixel electrode 191b.

The sub-pixel electrodes 191a and 191b applied with the data voltage and the common electrode 270 applied with the common voltage respectively form the first liquid crystal capacitor and the second liquid crystal capacitor such that the applied voltage is maintained after the thin film transistor is turned off. Each of the liquid crystal capacitors include the liquid crystal layer 3 as the dielectric material.

Next, the common electrode panel 200 will be described.

A light blocking member 220 for preventing light leakage is formed on an insulation substrate 210 made of transparent glass or plastic. The light blocking member 220 is formed according to the data lines 171a and 171b, and includes expansions overlapping the semiconductor islands 154a and 154b.

A common electrode 270 is formed on the light blocking member 220. The common electrode 270 is made of a transparent conductor such as ITO or IZO.

The common electrode 270 includes a plurality of cutouts 71, 72a, 72b, 73a, 73b, 74a, and 74b.

The cutouts 71, 72a, 72b, 73a, 73b, 74a, and 74b include a central cutout 71, first to third upper oblique cutouts 72a, 73a, and 74a, and first to third lower oblique cutouts 72b, 73b, and 74b. The cutouts 71, 72a, 72b, 73a, 73b, 74a, and 74b are disposed between the neighboring cutouts 92a, 92b, and 95 of the pixel electrode 191, or between the cutouts 92a, 92b, and 95 and the chamfered edges of the pixel electrode 191. Also, each of the cutouts 71, 72a, 72b, 73a, 73b, 74a, and 74b includes at least one oblique portion parallel to the upper and lower cutouts 92b or 92a of the pixel electrode 191.

The first to third oblique cutouts 72a, 72b, 73a, 73b, 74a, and 74b include a center portion, and an end transverse portion or an end longitudinal portion connected to the center portion and overlapping according to the edges of the pixel electrode 191. The end transverse portion or the end longitudinal portion forms the obtuse angle with the center portion.

The center cutout 71 includes a center transverse portion and a pair of oblique portions. The center transverse portion almost extends in the left side from the right edge of the pixel electrode 191 according to the storage electrode line 131, and a pair of oblique portions extend from the end of the center transverse portion toward the left edge of the pixel electrode 191 and are respectively almost parallel to the oblique cutouts 72a, 72b, 73a, 73b, 74a, and 74b. Also, the end of the center cutout 71 includes an end longitudinal portion extending according to the edge of the pixel electrode 191 while overlapping. The end longitudinal portion forms the obtuse angle by the oblique portion.

The oblique portion of the cutouts 71, 72a, 72b, 73a, 73b, 74a, and 74b includes a stem P and minute slits S1 and S2, like FIG. 1.

That is, the first slit group G1 and the second slit group G2 including a plurality of the first slits S1 and the second slits S2 are alternately disposed on two edges of the stem. Accordingly, the emission region A and the converging region B are alternately formed.

The minute slits S1 and S2 may be one of the exemplary embodiments of FIG. 3, FIG. 4. FIG. 5, and FIG. 6.

The minute slits determine the arrangement direction of the liquid crystal molecules 31 that are disposed on the boundary of the region corresponding to the cutouts 71, 72a, 72b, 73a, 73b, 74a, and 74b, and thereby the liquid crystal molecules are stably arranged.

The number and direction of the cutouts 71, 72a, 72b, 73a, 73b, 74a, and 74b may be changed according to the design elements.

Alignment layers 11 and 21 are formed on the inner surface of the display panels 100 and 200, and may be vertical alignment layers.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   a pixel electrode disposed on the first substrate, the pixel electrode comprising a first cutout;
   a second substrate facing the first substrate; and
   a common electrode disposed on the second substrate, the common electrode comprising a second cutout arranged alternately with the first cutout,
   wherein at least one of the first cutout and the second cutout comprises a stem and a plurality of first slits and a plurality of second slits extended from the stem and obliquely inclined with respect to a length direction of the stem, and an inclined direction of the first slits is opposite to an inclined direction of the second slits,
   wherein the first slits are divided into a plurality of first slit groups, and the second slits are divided into a plurality of second slit groups, and
   wherein the first slit groups and the second slit groups are alternately disposed.

2. The liquid crystal display of claim 1, wherein
   the first slits and the second slits are respectively disposed on two facing edges of the stem, and the arrangements of the first slits and the second slits are symmetrical to each other on the two facing edges of the stem.

3. The liquid crystal display of claim 2, further comprising third slits disposed between the first slit groups and the second slit groups, the third slits extending in a direction perpendicular to the length direction of the stem.

4. The liquid crystal display of claim 3, wherein the third slits are wider than the first slits and the second slits.

5. The liquid crystal display of claim 4, wherein the first slits and the second slits sandwiching the third slits are inclined in a direction away from the third slits at ends of the first slits and the second slits.

6. The liquid crystal display of claim 5, wherein the width of the first slits and the second slits decreases further from the stem.

7. The liquid crystal display of claim 6, wherein the first slits and the second slits each comprise two long edges and one short edge, wherein the one short edge connects the two long edges to each other, and
the two long edges comprise a first long edge perpendicular to the stem and a second long edge obliquely inclined to the stem.

8. The liquid crystal display of claim 2, wherein the first slits and the second slits are curved.

9. The liquid crystal display of claim 8, wherein the first slits and the second slits each comprise a lower portion connected to the stem and an upper portion extended from the lower portion, and
the lower portion and the upper portion form an obtuse angle.

10. The liquid crystal display of claim 1, further comprising
third slits disposed between the first slit groups and the second slit groups, the third slits extending in a direction perpendicular to the length direction of the stem.

11. The liquid crystal display of claim 10, wherein the third slits are wider than the first slits and the second slits.

12. The liquid crystal display of claim 11, wherein the first slits and the second slits close to the third slits are inclined in a direction away from the third slits further from the stem.

13. The liquid crystal display of claim 1, wherein the first slits and the second slits are respectively disposed on two facing edges of the stem, and the arrangement of the first slits and the second slits are symmetrical to each other on the two facing edges of the stem.

14. The liquid crystal display of claim 1, wherein the width of the first slits and the second slits decreases further from the stem.

15. The A liquid crystal display of claim 14, wherein the first slits and the second slits comprise two long edges and one short edge, wherein the one short edge connects the two long edges to each other, and
the two long edges comprise a first long edge perpendicular to the stem and a second long edge obliquely inclined to the stem.

16. The liquid crystal display of claim 1, wherein the first slits and the second slits are curved.

17. The liquid crystal display of claim 16, wherein the first slits and the second slits each comprise a lower portion connected to the stem and an upper portion extended from the lower portion, and
the lower portion and the upper portion form an obtuse angle.

18. The liquid crystal display of claim 1, wherein the width of the first slits is the same as the interval between two immediately adjacent first slits, and
the width of the second slits is the same as the interval between two immediately adjacent second slits.

19. The liquid crystal display of claim 1, wherein the width of the first slits and the second slits is in the range of one-third to three times an interval between the common electrode and the pixel electrode.

* * * * *